United States Patent
Lahib

(10) Patent No.: US 12,000,367 B2
(45) Date of Patent: Jun. 4, 2024

(54) HYBRID POWER GENERATION SYSTEM USING TIDAL ENERGY

(71) Applicant: Musbah Ali Lahib, Sharjah (AE)

(72) Inventor: Musbah Ali Lahib, Sharjah (AE)

( * ) Notice: Subject to any disclaimer, the term of this patent is extended or adjusted under 35 U.S.C. 154(b) by 0 days.

(21) Appl. No.: 17/897,343

(22) Filed: Aug. 29, 2022

(65) Prior Publication Data

US 2023/0279832 A1 Sep. 7, 2023

Related U.S. Application Data

(60) Provisional application No. 63/316,544, filed on Mar. 4, 2022.

(51) Int. Cl.
*F03B 13/26* (2006.01)

(52) U.S. Cl.
CPC ...... *F03B 13/262* (2013.01); *F05B 2220/706* (2013.01); *F05B 2220/708* (2013.01)

(58) Field of Classification Search
CPC .................................................. F03B 13/262
See application file for complete search history.

(56) References Cited

U.S. PATENT DOCUMENTS

| | | | | |
|---|---|---|---|---|
| 163,451 A | * | 5/1875 | Buckner, Jr. | F03B 13/186 60/502 |
| 332,875 A | * | 12/1885 | Bussard et al. | F03G 1/00 185/39 |
| 583,689 A | * | 6/1897 | McDonald | F03B 13/186 60/507 |
| 1,276,112 A | * | 8/1918 | Reed | F03B 13/186 60/507 |
| 1,393,472 A | * | 10/1921 | Williams | F03B 13/262 405/76 |
| 1,594,070 A | * | 7/1926 | Sherlock | F03B 13/262 60/496 |
| 4,355,511 A | * | 10/1982 | Jones | F03B 13/1845 60/507 |

(Continued)

FOREIGN PATENT DOCUMENTS

| | | |
|---|---|---|
| CN | 204099117 U | 1/2015 |
| CN | 107939589 B | 4/2018 |
| WO | 2019030555 A1 | 2/2019 |

OTHER PUBLICATIONS

Machine English translation of CN107939589.

(Continued)

*Primary Examiner* — Tulsidas C Patel
*Assistant Examiner* — Thomas K Quigley
(74) *Attorney, Agent, or Firm* — Fishman Stewart PLLC

(57) ABSTRACT

A system for generating tidal power comprising a tank supported by at least one vertical gear, such that the tank travels in an upward direction and a downward direction with the at least one vertical gear, the tank travel based on a vertical motion of a tide. At least one circular gear is coupled to the at least one vertical gear, such that the at least one circular gear rotates when the at least one vertical gear moves in the upward direction and the downward direction. A shaft is connected to the at least one circular gear, such that the shaft rotates when the at least one circular gear rotates. A dynamo is attached to the shaft, such that the rotation of the shaft is transmitted to the dynamo for power generation.

20 Claims, 8 Drawing Sheets

(56) References Cited

U.S. PATENT DOCUMENTS

| | | | | |
|---|---|---|---|---|
| 4,392,060 A * | 7/1983 | Ivy | ............... | F03B 13/186 60/507 |
| 4,931,662 A * | 6/1990 | Burton | ............... | F03B 13/1815 60/507 |
| 5,929,531 A * | 7/1999 | Lagno | ............... | F03B 13/262 417/330 |
| 7,305,823 B2 * | 12/2007 | Stewart | ............... | F03B 13/1845 60/495 |
| 8,723,355 B2 * | 5/2014 | Eder | ............... | F03B 13/16 290/43 |
| 2009/0212571 A1 * | 8/2009 | Atilano | ............... | F03B 13/186 290/53 |
| 2010/0264659 A1 * | 10/2010 | Chi | ............... | F03B 13/1855 290/53 |
| 2010/0283261 A1 * | 11/2010 | Ryan | ............... | F03B 17/04 290/1 R |
| 2011/0011086 A1 | 1/2011 | Megaro | | |
| 2011/0084488 A1 * | 4/2011 | Eder | ............... | F03B 13/186 290/53 |
| 2011/0221209 A1 * | 9/2011 | Ryan | ............... | F03B 17/02 290/1 R |
| 2012/0235414 A1 * | 9/2012 | Levy | ............... | F03B 13/186 290/53 |
| 2012/0261923 A1 * | 10/2012 | Hassavari | ............... | B63B 35/44 290/55 |
| 2013/0008157 A1 | 1/2013 | Zuo | | |
| 2013/0229011 A1 * | 9/2013 | Kawaguchi | ............... | F03B 13/186 290/42 |
| 2014/0145442 A1 * | 5/2014 | Hart | ............... | F03B 13/18 290/53 |
| 2019/0323477 A1 | 10/2019 | Blodgett | | |

OTHER PUBLICATIONS

Machine English translation CN204099117U.
United Arab Emirates Office Action dated May 17, 2023, P6002004/2022 (translation only).
United Arab Emirates Search Report dated May 17, 2023, P6002004/2022 (translation only).

\* cited by examiner

900

| | Floor Cavity 104 | LOCK 506 | TANK 102 |
|---|---|---|---|
| 902 | empty, closed | unlocked | floating, low point |
| 904 | empty, closed | unlocked | rising |
| 906 | empty, closed | unlocked | rising |
| 908 | filling, opening | unlocked | peak height |
| 910 | full, opening | unlocked | peak height |
| 912 | full, closed | locked | falling |
| 914 | emptying, opening | unlocked | low point |
| 916 | empty, closed | unlocked | floating, low point |

*FIG. 10*

HYBRID POWER GENERATION SYSTEM USING TIDAL ENERGY

CROSS-REFERENCE TO RELATED APPLICATION

This application claims the benefit of U.S. Provisional Patent Application Ser. No. 63/316,544 filed on Mar. 4, 2022, the disclosure of which is hereby incorporated by reference in its entirety as though fully set forth herein.

TECHNICAL FIELD

This disclosure relates generally to a hybrid power generation system in the sea that generates power from tidal energy using a platform or multiple platforms.

BACKGROUND

Worldwide demand for clean electricity and renewable fuels continue to grow as problems associated with climate change and diminishing non-renewable resources increase. Solar power and wind, amongst various other sources, are known to have been utilized to produce energy that is sustainable.

Seawater makes up approximately 70% of the Earth's surface, providing a vast resource compared to land-based energy sources. Moreover, because water is denser than air, tidal energy has the potential to be more powerful than wind energy. Tidal energy additionally is generally more predictable and consistent than wind or solar energy, making tidal energy an important renewable energy source to pursue.

Tidal energy is produced by the surge of ocean waters during the rise and fall of tides. Where the difference in water height between high tide and low tide is significant, electricity may be generated by tidal movement.

Known systems of generating power from tidal energy include at least tidal streams, barrages, and tidal lagoons. In tidal streams or fast-flowing bodies of water, turbines may be placed in the water to produce energy. Though steady and reliable, turbine machines may disrupt tide flows and may be effective in shallow water. Barrages pool water with the use of a dam and then release the water at once through turbines to generate electrical energy. The use of a dam may disrupt the environment surrounding the generator significantly, affecting land, water flow, and plant and animal life. Similar to barrages, tidal lagoons are pools of water that can be constructed by natural or manmade barriers. Though tidal lagoons typically disrupt the environment less than barrages, their energy output is generally low and fully functional generator systems may not be successful.

Known systems for tidal energy utilization face obstacles and may require conditions including the need for facilities to occupy large areas of beaches, which may negatively affect the environment and deprive cities and regions of valuable sea fronts. Moreover, these facilities may require an additional adaptation of the terrain and levels of the land adjacent to beaches to accommodate the quantity of water held by dams.

Therefore, a need exists for an improved power generation system based on movement of tides that can be utilized on land or in the open sea.

BRIEF DESCRIPTION

The disclosure is directed toward a system and a method for generating power from tidal energy using a platform with a tank or multiple tanks.

According to one aspect, a system for generating tidal power comprising a tank supported by at least one vertical gear, such that the tank travels in an upward direction and a downward direction with the at least one vertical gear, the tank travel based on a vertical motion of a tide. At least one circular gear is coupled to the at least one vertical gear, such that the at least one circular gear rotates when the at least one vertical gear moves in the upward direction and the downward direction. A shaft is connected to the at least one circular gear, such that the shaft rotates when the at least one circular gear rotates. A dynamo is attached to the shaft, such that the rotation of the shaft is transmitted to the dynamo for power generation.

According to another aspect, a method of generating tidal power comprising moving a tank in an upward direction and a downward direction, the tank configured to be supported by at least one vertical gear and the at least one vertical gear configured to travel with the tank, the tank travel based on a vertical motion of a tide, rotating at least one circular gear, the at least one circular gear configured such that the at least one circular gear rotates when the at least one vertical gear rises in the upward direction, spinning at least one shaft, the at least one shaft connected to the at least one circular gear such that the at least one shaft spins when the at least one circular gear rotates, and transferring rotation of the at least one shaft to a dynamo, the dynamo configured to generate power from rotational movement of the at least one shaft.

BRIEF DESCRIPTION OF THE DRAWINGS

FIG. 10 is a chart generally illustrating the operational steps of a hybrid power generation system used in connection with rising and lowering tides.

DETAILED DESCRIPTION

Figure 1:
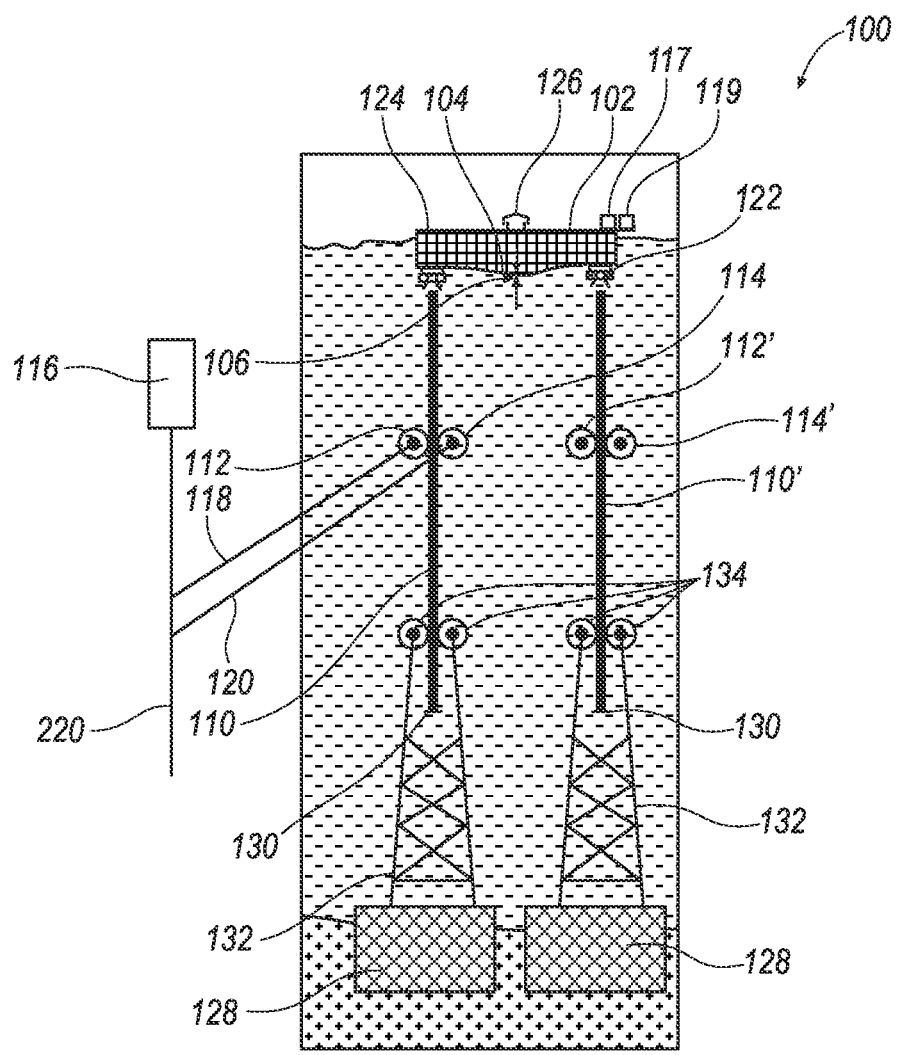
FIG. 1 is a schematic side view generally illustrating a platform used in connection with a hybrid power generation system.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

This disclosure relates generally to a hybrid power generation system in the sea that generates power from tidal energy using a platform or multiple platforms. An exemplary generator system may include a tank configured to move with the tide of seawater. The tank may be located on top of at least one vertical gear, which additionally may move vertically with the tide. The generator system may also include a set of circular gears connected on each side of the vertical gears, such that the circular gears are configured to rotate with the vertical movement of the vertical gears. The rotating movement of the circular gears may be transmitted via shafts to a dynamo, providing a sustainable source of power generation.

Figure 2:
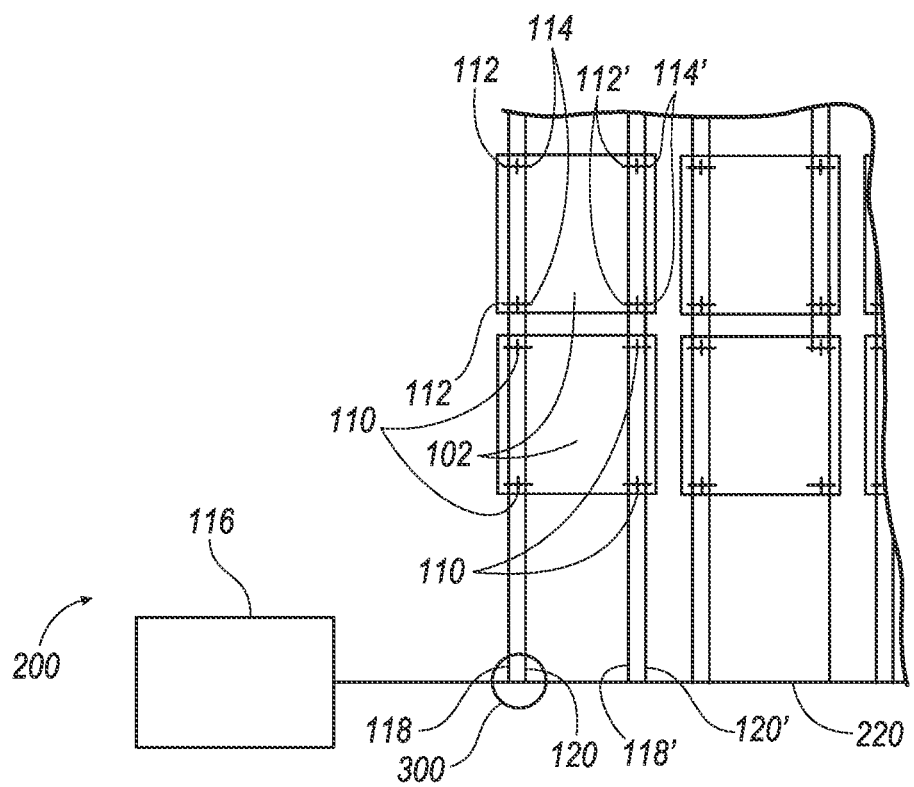
FIG. 2 is a schematic top view generally illustrating a system of multiple platforms used in connection with a hybrid power generation system.

Referring to the figures, FIG. 1 is a schematic side view of a platform 100 used in connection with the hybrid power generation system. Platform 100 includes a tank 102 configured to rise and fall with the tide of the sea, the tank having a floor cavity 104 and a vent 126. The illustrated example is of single tank 102 on a single platform 100, but it should be appreciated that multiple tanks 102 may be included on a single platform 100, or that multiple platforms 100 may be connected to create a larger system as illustrated in FIG. 2.

Tank 102 is generally of a square shape and configured as a box with a bottom, side walls, and a top surface. The bottom of tank 102 includes floor cavity 104 capable of opening and closing such that water may enter or leave tank 102 based on the opening and closing of a valve 106 in the floor cavity 104. That is, floor cavity 104 includes valve 106, and as tank 102 moves in an upward and downward movement with the rise and fall of the tide, valve 106 remains closed to keep water inside or outside of tank 102. As will be described in more detail below, as tank 102 reaches peak height of the tide, valve 106 opens to allow water through floor cavity 104 and into tank 102. As tide recedes and tank 102 remains full of water, the weight of the water contained within tank 102 is used as gravitational or potential energy to drive dynamo 116 and extract electrical energy therefrom.

Platform 100 also operates such that, once the gravitational energy is expended and tank 102 reaches proximate the water level at low tide, tank 102 is then emptied so that, during the next cycle of the tide, tank 102 being empty will be generally buoyant and will float upwards, generating power, and with the rising tide such that tank 102 will then fill only when near high tide, at which point the cycle repeats and as the tide recedes, electrical power generation resumes during the downward motion of tank 102 being weighted with water. The disclosed system also includes a locking mechanism, to be discussed later, that allows sloshing, pivoting, and axial motion to occur when tank 102 is engaged with the rising tide, but then locks in place to prevent tipping over when the tank is full during electrical power generation.

Tank 102 includes at least one hinge 122 point, two of which are visible in FIG. 1, and is illustrated as having four hinges 122 at each corner of tank 102 bottom. Hinges 122 couple tank 102 to vertical gears 110. Hinges 122 include parallel tracks, ball joints, and locks which allow for sliding and pivoting movement of tank 102 when unlocked, or for prohibiting pivoting movement when locked as illustrated in FIGS. 6A & 6B and FIGS. 7A-7C.

Connected to hinges 122 are at least one of vertical gears 110, and preferably one hinge 122 and vertical gear 110 are included at each corner of tank 102. Vertical gears 110 are configured to rise and fall with tank 102 as the tide rises and recedes, such that vertical gears 110 travel with vertical movement of tank 102. At least one pair of circular gears 112, 114 is positioned on each vertical gear 110 such that a first circular gear 112 is located on one side of vertical gear 110, and a second circular gear 114 is located on a second side, opposite first circular gear 112, of vertical gear 110. Vertical gear 110 is positioned between first circular gear 112 and second circular gear 114 such that as vertical gear 110 moves upward or downward with the movement of tank 102, vertical movement of vertical gear 110 rotates first and second circular gears 112. In one example, only one of circular gears 112, 114 is included as a gear, and the other may be a simple, smooth, rotational element that can withstand pressure applied from the other side of vertical gear 110.

In the illustrated example, when vertical gear 110 moves in an upward direction, first circular gear 112 is engaged with a first shaft 118 such that first shaft 118 rotates clockwise with first circular gear 112. At the same time, second circular gear 114 rotates passively without being engaged with a second shaft 120. When vertical gear 110 moves in a downward direction, second circular gear 114 is engaged with second shaft 120 so that second shaft 120 rotates counterclockwise with second circular gear 114. At the same time, first circular gear 112 rotates passively without being engaged with first shaft 118. This is such that first circular gear 112 and first shaft 118 are engaged while vertical gear 110 travels in an upward direction. Second circular gear 114 and second shaft 120 are engaged while vertical gear 110 travels in a downward direction. First shaft 118 and second shaft 120 transmit rotation of shafts 118, 120 to the main shaft 220 which is in turn transmitted to dynamo 116. Main shaft 220 may include a transmission box and a speed controller to aid in transferring rotational movement of shafts 118, 120, 220 into electrical power.

Vertical gears 110 are held in place by a vertical gear holder 134. Vertical gear holder 134 is illustrated as a set of circular gears that surround vertical gear 110. However, it is noted that other vertical gear holders 134 could be configured to hold vertical gear 110 in place and allow vertical gear 110 to move upward and downward. It is also contemplated that vertical gear holders 134 may themselves be attached to their own respective shafts and dynamos, providing yet additional options and configurations for extracting electrical power. At one end of vertical gear 110 and opposite tank 102 is a vertical gear lock 130. Vertical gear lock 130 is positioned below vertical gear holder 134 such that as vertical gears 110 move upward, vertical gear lock 130 will stop at vertical gear holder 134 preventing further upward movement. Vertical gear holders 134 are attached to a vertical gear base 132. Vertical gear base 132 is illustrated as a triangular base with cross-sections for added stability.

Vertical gear base 132 is further affixed, optionally, to a platform base 128 which is positioned on the sea floor.

Positioned on top surface 124 of tank 102 is a controller 117. Controller 117 communicates with an external network to provide operational controls to platform. Controller 117 may upload data to the external network and communicate with the external network. Controller 117 monitors operation and provides manual operation of system. Controller 117 selectively operates vertical gear lock 130 to hold tank 102 at a high point once the tide begins to recede, deferring electrical power generation until the tide has dropped below the tank 102. Controller 117 is configured to aid in opening and closing valve 106 in floor cavity 104. Controller 117 may communicate with external networks to provide controls such as opening and closing valve 106 based on manual operation from an operator, by a timer programmed according to a tide schedule, and/or in conjunction with sensors 119 connected to controller 117. For example, sensor 119 may be known conventional sensors utilizing laser beams to indicate when a tank 102 reaches peak and low tide heights. Sensors 119 may additionally be an electric float level transmitter or a floating ball at a tank 102 floor cavity 104.

Referring now to FIG. 2, and correlating generally with FIG. 1, a top view of a hybrid power generation system 200 is illustrated, which may include multiple, but at least one platform 102. In the illustrated example, hybrid power generation system 200 includes four platforms 100, each platform 100 containing one tank 102. Each tank 102 includes vertical gear 110 attached to each corner of each tank 102. Each of four vertical gears 110 includes a first circular gear 112 and a second circular gear 114. First circular gear 112 is attached to first shaft 118 such that first shaft 118 is positioned through the center of first circular gear 112. Second circular gear 114 is attached to second shaft 120 such that second shaft 120 is positioned through the center of second circular gear 114. First shaft 118 and second shaft 120 are positioned such that shafts 118, 120 are connected to a plurality of pairs of first and second circular gears 112, 114. First shaft 118 and second shaft 120 extend parallel to each other. System 200 may have additional first shafts 118 and second shafts 120 depending on size and number of platforms 102 used in system 200. For example, each row of platforms 100 includes two pairs of first shafts 118 and second shafts 120. A first row of platforms 100 includes a first pair of shafts 118, 120 engaged with vertical gears 110 on a first side of platforms 100. A second pair of shafts 118', 120' is engaged with vertical gears 110' on a second side of platforms 100. The plurality of first shafts 118 and second shafts 120 are positioned such that shafts 118, 120 connect with a receiving shaft 220.

Figure 3:
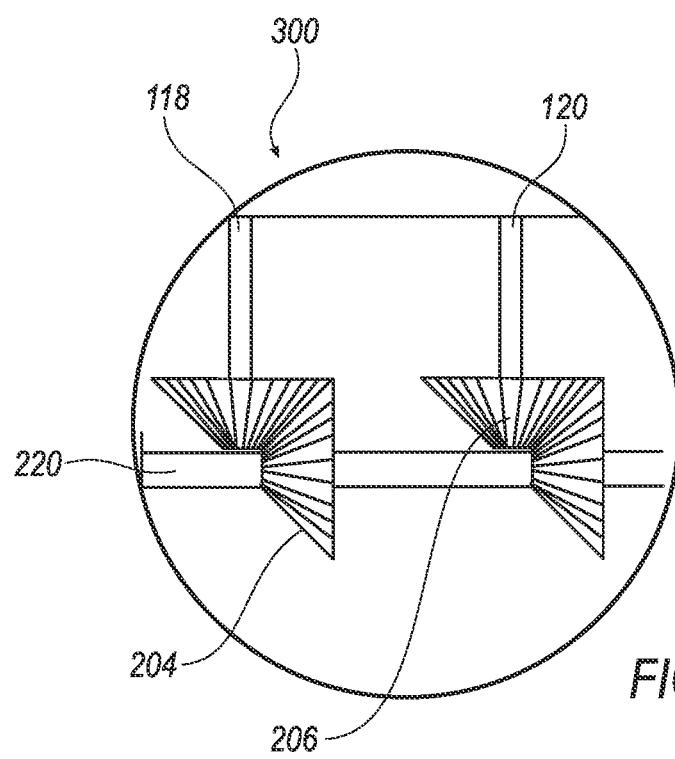
FIG. 3 is a schematic up close view generally illustrating a connection between shafts used in connection with platforms and a receiving shaft used in connection with a dynamo.

FIG. 3 illustrates a close-up view of first shaft 118 and second shaft 120 connecting with receiving shaft 220. First shaft 118 connects with receiving shaft 220 at a first differential 204, such that rotational movement from first shaft 118 is transferred to receiving shaft 220 via first differential 204. First differential 204 is a unit of gears, including at least two gears which rotate to transfer movement from the axis of first shaft 118 to the axis of receiving shaft 220. Second shaft 120 connects with receiving shaft 220 at a second differential 206, such that rotational movement from second shaft 120 is transferred to receiving shaft 220 via second differential 206. Second differential 206 is a unit of gears, including at least two gears which rotate to transfer movement from the axis of second saft 120 to axis of receiving shaft 220. Thus, rotational movement from a plurality of first shafts 118 and second shafts 120 is transferred to receiving shaft 220. Receiving shaft 220 is the inputting axle of dynamo 116 as illustrated in FIG. 2. Rotational movement from receiving shaft 220 is inputted into dynamo 116 and dynamo 116 converts mechanical rotation into a pulsing direct electric current that can be utilized for power generation.

Figure 4:
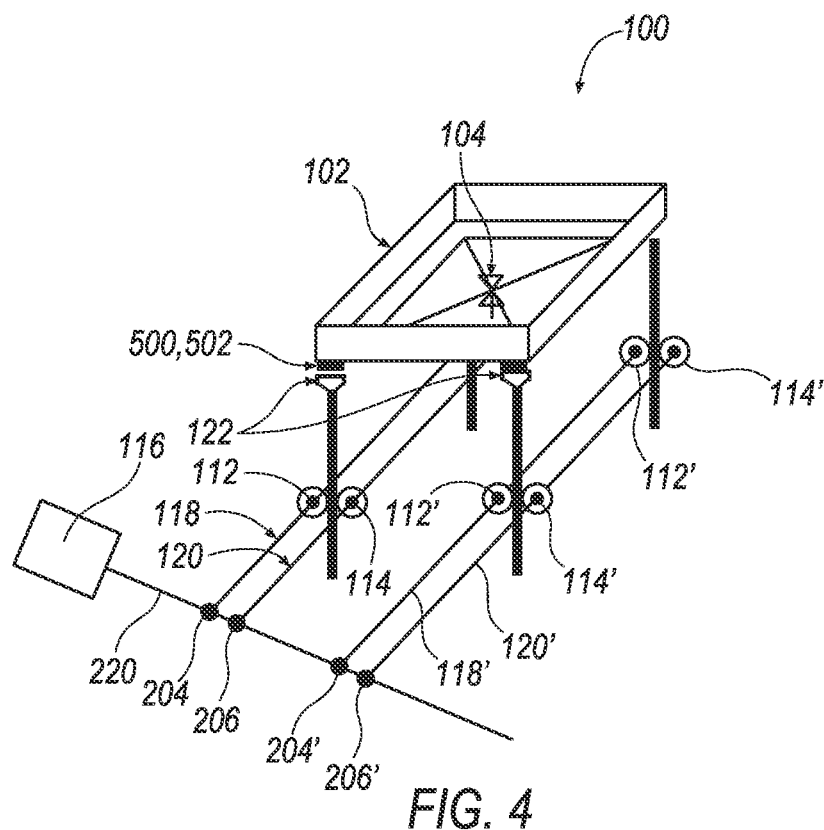
FIG. 4 is a perspective view generally illustrating a platform used in connection with a hybrid power generation system.

FIG. 4 illustrates a perspective view of platform 100 that includes tank 102 used in connection with hybrid power generation system 200. Tank 102 is a square chamber, but a variety of shapes and sizes may be used. Bottom of tank 102 includes a floor cavity 104 that is configured to open and close at different points of operation of system 200. Tank 102 is carried on top of vertical gears 110 at each corner of tank 102 via hinge 122. Each vertical gear 110 passes between first circular gear 112 and second circular gear 114. Circular gears 112, 114 rotate as vertical gears 110 move upward and downward in between circular gears 112, 114. Movement of circular gears 112, 114 is transmitted to dynamo 116 for electricity production via set of shafts 118, 120. Each tank 102 includes two set of shafts 118, 120. A first pair of a first shaft 118 and a second shaft 120 are connected to circular gears 112, 114 for two vertical gears 110 sharing a first side of tank 102. A second pair of a first shaft 118' and a second shaft 120' are connected to circular gears 112', 114' for two vertical gears 110' sharing a second side, opposite a first side of tank 102.

Figure 5:
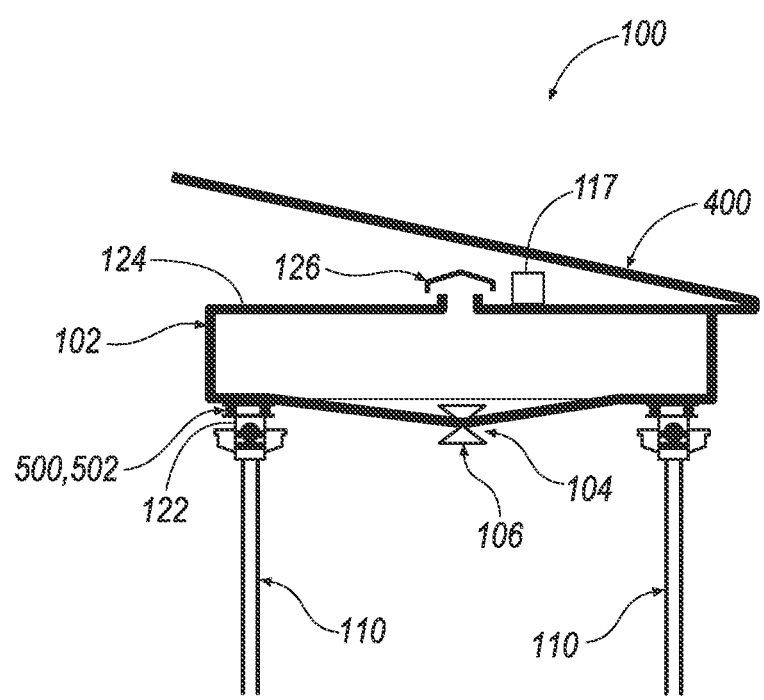
FIG. 5 is a side view generally illustrating a platform used in connection with a hybrid power generation system.

Referring now to FIG. 5, tank 102 may include a top surface 124 through which a vent 126 penetrates. Vent 126 provides for air venting during filling and emptying of tank 102, to avoid suction or gurgling of the water as it enters or exits tank 102 during operation of floor cavity 104. Without vent 126, and as water enters or escapes tank 102, air would generally have to be displaced by passing out of the bottom of tank 102. Thus, vent 126 provides an opportunity for air to enter and exit without having to displace water via the underside of tank 102. Tank surface 124 provides free space and a free platform which may be utilized for additional mechanisms. For example, as illustrated, tank surface 124 may be utilized for installing solar panels 400 that produce additional electrical energy. Installing solar panel 400 allows platform 100 to produce energy from multiple sources at the same time, or at separate times according to demand, requirements, and weather conditions.

Figures 6A, 6B:
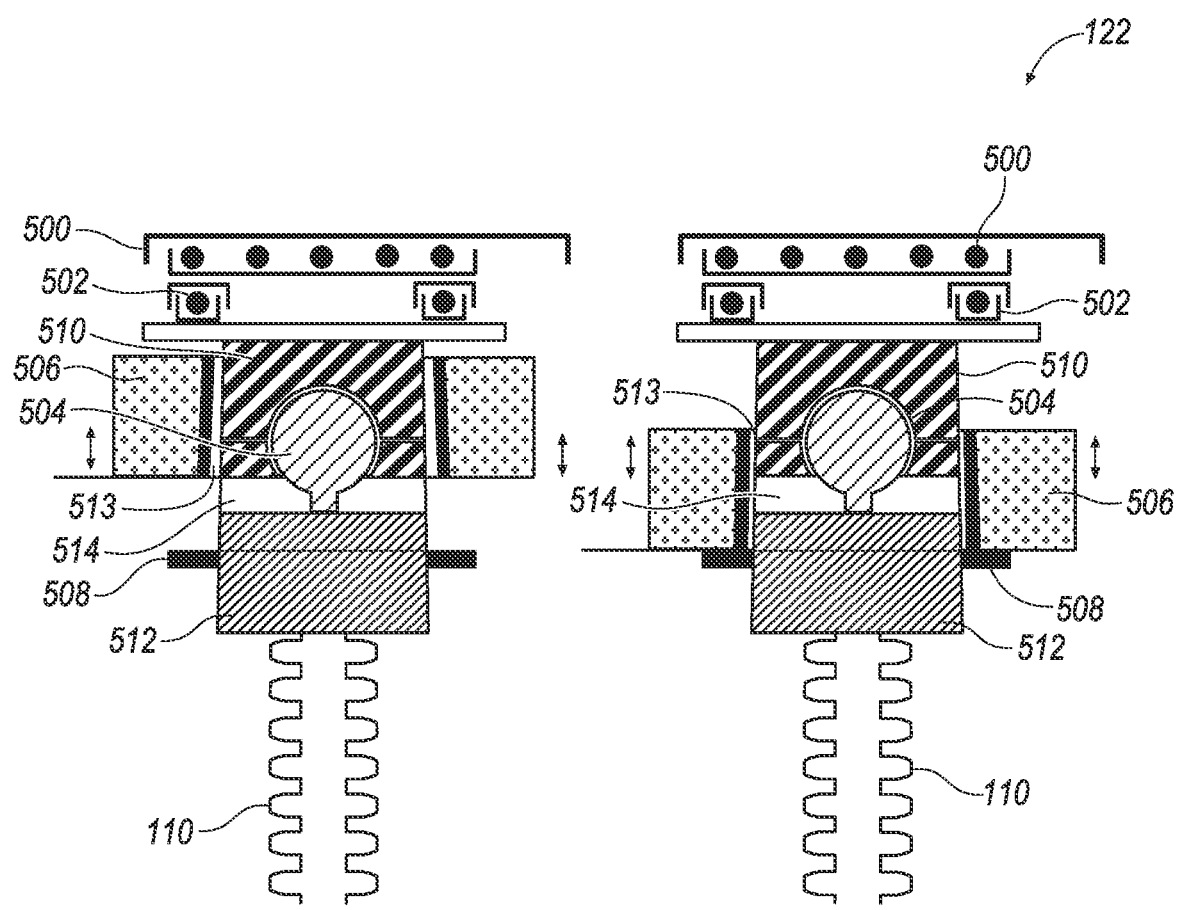
FIG. 6A is a schematic view generally illustrating a hinge used in connection with a hybrid power generation system in an unlocked position.
FIG. 6B is a schematic view generally illustrating a hinge used in connection with a hybrid power generation system in a locked position.

Referring now to FIGS. 6A and 6B, a close-up view of hinge 122 is illustrated in an unlocked and a locked position, with FIG. 6A in an unlocked position. When unlocked, hinge 122 allows tank 102 to sway and pivot with the motion of waves, preventing damage from occurring to tank 102 and other components. However, swaying is allowed by parallel tracks 500, 502, and pivoting is allowed by a ball joint 504. Thus, swaying can occur in linear directions front to back and side to side, and permissible via a first set of sliding tracks 500 (side to side) on hinge 122 and a second set of sliding tracks 502 that are orthogonal to first set of tracks 500 (forward to back motion). Thus, first set 500 and second set 502 of orthogonal sliding tracks allows tank 102 to move in a plane and collectively in any direction orthogonal to the vertical motion of tank 102, when tank 102 is floating on surface of water. The allowed movement by sliding tracks 500, 502 provides freedom of tank 102 to move with the waves such that waves do not crash into and over tank 102, but rather tank 102 sways with waves. Movement from sliding tracks 500, 502 may also be used to generate power such that tank 102 is a hybrid system with several forms of power generation.

Pivoting or sloshing of tank 102 is allowed by ball joint 504. Ball joint 504 is positioned such that joint 504 extends from a lower portion 512 of hinge 122 and into a round opening in upper portion 510 of hinge 122. Upper portion 510 of hinge can pivot around ball joint 504 in round opening. However, to prevent ball joint 504 from allowing tank 102 and upper portion 510 to tilt (and potentially damage tank 102 or lose water due to severe tilting of tank 102), hinge 122 is provided with a lock or locking mechanism that allows for jostling or tilting to occur when tank 102 is in the water, and to reduce jostling when tank 102 is not in the water.

In an unlocked position, upper portion 510 is capable of pivoting freely on ball joint 504. Lock 506, in examples, is made of polystyrene foam or another buoyant material and can move upward and downward based on its position with respect to hinge 122. In one example, upper portion 510 and lower portion 512 are conical in shape to allow lock 506 to float around upper portion 510 in a raised position and drop around a wider surface of a lower portion 512 in a lowered position. Thus, when water level is above hinge 122, lock 506 floats upward and surrounds upper portion 510. Gap 514 allows movement of upper portion 510 on ball joint 504 without upper portion 510 coming in contact with lower portion 512. Lock 506 remains in the raised position as it floats due to its buoyancy in the water.

As water level drops below hinge 122, lock 506 drops to a lowered position due to gravity. Lock 506 falls to a position such that it simultaneously surrounds both upper portion 510 and lower portion 512 of hinge 122. The conical shape of upper portion 510 and lower portion 512 tightens lock 506 to the outer surface of upper portion 510 and lower portion 512 minimizing or restricting pivoting motion of upper portion 510 on ball joint 504. Lock 506 thereby reduces movement of ball joint 504 as gap 513 reduces in size due to conical shape of upper portion 510 and lower portion 512, and as upper portion 510 is locked in a position relative to lower portion 512 such that upper portion 512 is prohibited from pivoting on ball joint 504.

Lock 506 is prohibited from falling below gap 514 and lower portion 512 by a lock stopper 508. Stopper 508 is positioned just below top of lower portion 512 such that lock 506 may descend to a position such that it simultaneously covers upper portion 510, gap 514, and lower portion 512, but will not fall further when water level is below hinge 122. In the illustrated example, the locking mechanism includes engagement of cylindrical shapes and is gearless, but additional locking mechanisms could be utilized. For example, lock 506 may be coupled to a gear structure such that an inner gear and an outer gear mate when lock 506 is in a lower position, such that the inner and outer gear prevent rotational or rocking movement of hinge 122 when lock 506 is engaged.

Figures 7A, 7B, 7C:
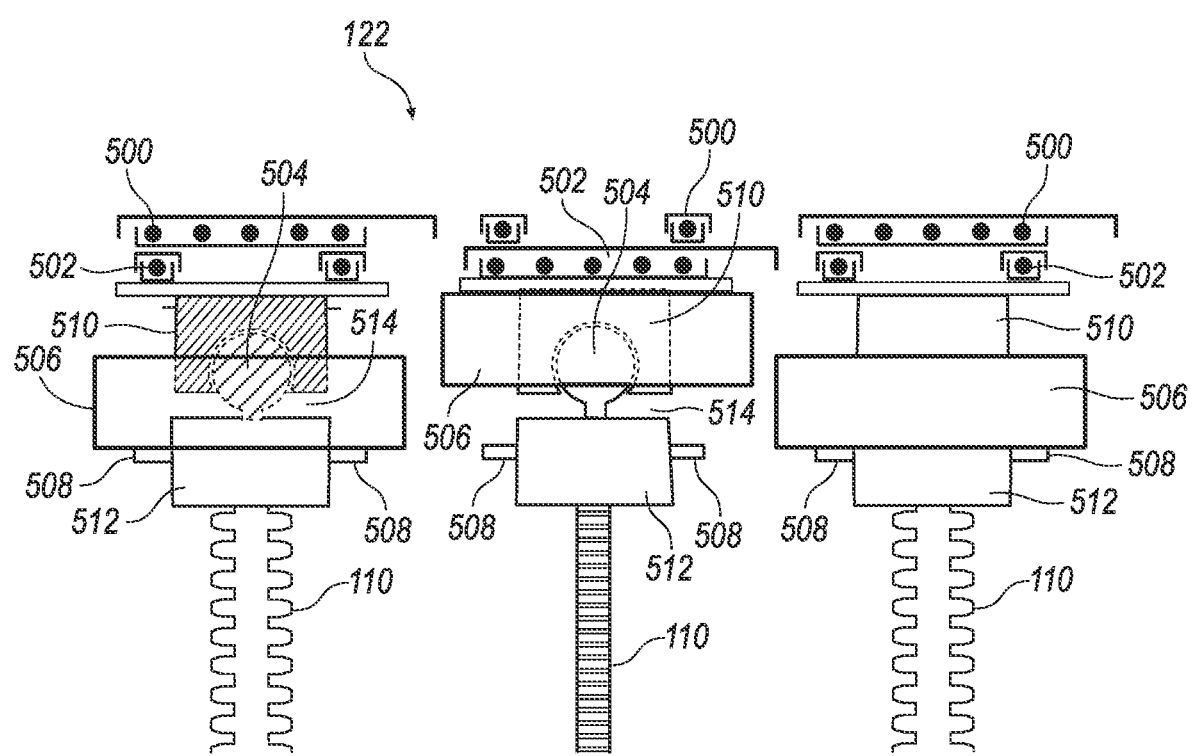
FIG. 7A is a schematic front view generally illustrating a hinge used in connection with a hybrid power generation system in a locked position.
FIG. 7B is a schematic front view generally illustrating a hinge used in connection with a hybrid power generation system in an unlocked position.
FIG. 7C is a schematic side view generally illustrating a hinge used in connection with a hybrid power generation system in a locked position.

Referring now to FIGS. 7A-7C, hinge 122 is illustrated to show operation of lock 506. As shown in FIG. 7A, hinge 122 is in a locked position and illustrates the inside of lock 506. Lock 506 is in a downward position, resting atop lock stopper 508 due to gravity as hinge 122 is above the water level (not shown) and lock 506 is not floating but above the water surface. Lock 506 surrounds upper portion 510 and lower portion 512, such upper portion 510 is unable to pivot on ball joint 504 in related to lower portion 512. The conical shape of upper portion 510 and lower portion 512 allow lock 506 to fall to a lowered position to prevent pivoting movement.

FIG. 7B illustrates hinge 122 in an unlocked position. FIG. 7B additionally illustrates a view 90 degrees offset from that of the view in FIG. 7A. Lock 506 is in a raised position, generally in line with upper portion 510. Lock 506 is in an upward position due to buoyancy of lock 506, and the water level (not shown) raises lock 506. Hinge 122 is below water level and thus in an unlocked position because lock 506 floats to its raised position. Lock 506 is prevented from floating above parallel sliding tracks 502, keeping lock 506 aligned with upper portion 510. Gap 514 is exposed, allowing upper portion 510 to pivot atop ball joint 504.

FIG. 7C illustrates hinge 122 above water (not shown) in a locked position and from an external side view. As shown, lock 506 is positioned atop of lock stoppers 512 due to gravity and being above the water level in a locked position. Lock 506 sits atop lock stopper 512 such that lock 506 covers lower portion 512, gap 514, and upper portion 510. Lock 506 prevents upper portion 510 from pivoting on ball joint 504, preventing upper portion 510 from moving relative to lower portion 512 and gap 514.

Figure 8:
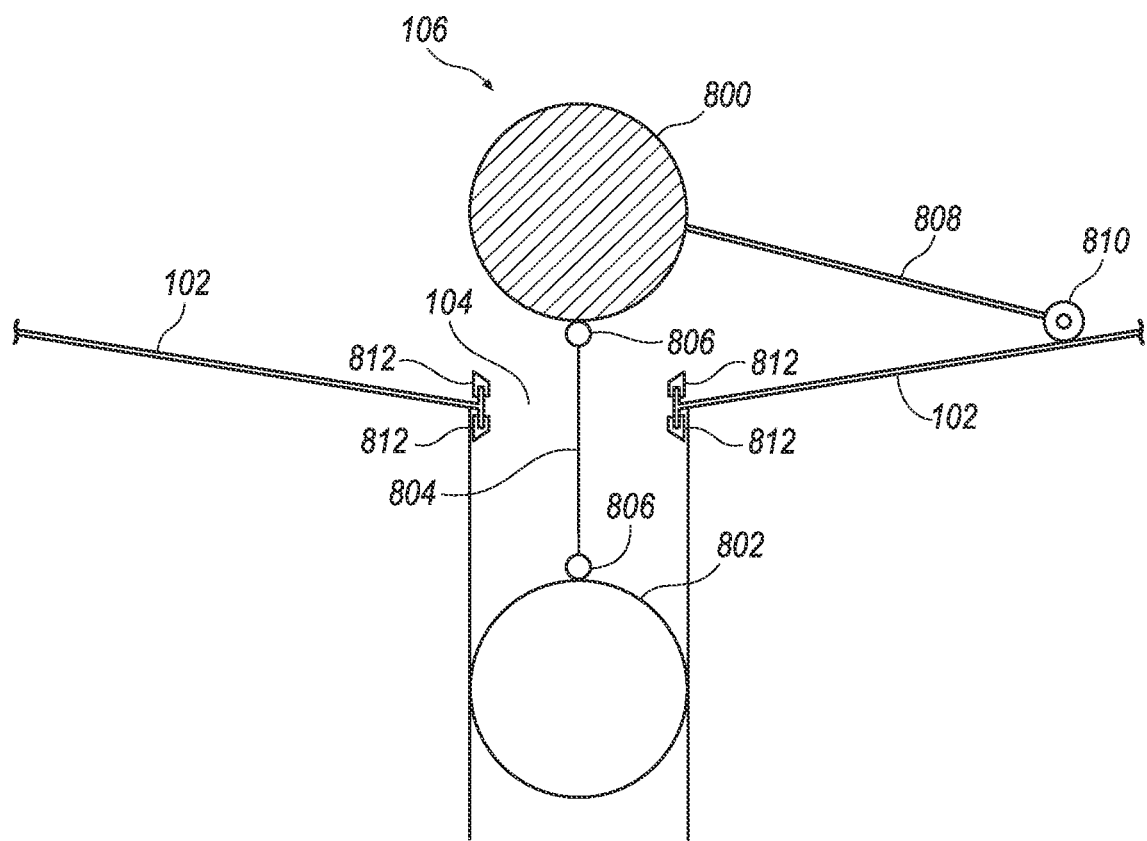
FIG. 8 is a schematic view generally illustrating a valve of a floor cavity used in connection with a hybrid power generation system.

FIG. 8 illustrates valve 106 in floor cavity 104 of the bottom surface of tank 102. In the illustrated example, valve 106 is a dual-ball mechanism for opening and closing valve 106. Inside tank 102 is a heavy internal ball 800 with a diameter larger than floor cavity 104 such that ball 800 can block floor cavity 104 when valve 106 is closed. Internal ball 800 is attached to a ball lifter 810 via a ball arm 808. Ball lifter 810 in one example may be a wheel which travels on the slopped tank 102 bottom. Internal ball 800 is additionally connected to an external ball 802 via a ball connection 804. Internal ball 800 attaches to ball connection 804 via a flexible joint 806 to provide flexibility in the connection for ample movement. Ball connection 804 is a thin rod that travels from inside of tank 102 to outside of tank 102 through floor cavity 104. External ball 802 is attached to end of ball connection 804, opposite internal ball 800, and via a second flexible joint 806. Ball connection 804 allows internal ball 800 to move upward or downward and have external ball 802 follow movement of internal ball 800, and vice versa. External ball 802 similarly has a diameter larger than floor cavity 104 to act as a block when pressed against floor cavity 104. Rubber anchors 812 may be placed within floor cavity 104 to provide a position for external ball 802 and internal ball 804 to rest against and tighten block of floor cavity 104 when in a closed position.

Tank 102 begins as empty with valve 806 closed and external ball 802 pressed against rubber anchors 812 such that external ball 802 prevents water from entering tank 102. Tank 102 is carried on the water surface, being lifted by the tide and swayed by waves. When tank 102 reaches a peak height of the tide, valve 106 opens to fill tank 102 with water. Valve 106 opens as external ball 802 lowers to an intermediate position where neither external ball 802 nor internal ball 800 are positioned against rubber anchors 812 and valve 106 in floor cavity 104 is open, allowing water to enter tank 102. When tank 102 is full of water, heavy internal ball 800 lowers to sit firmly against rubber anchors 812, closing floor cavity 104. As tide recedes, floor cavity 104 remains closed such that water remains in tank 102 and allows tank 102 to recede under weight of the water. As tank 102 approaches the low height of tide, valve 106 begins to open such that water may exit through floor cavity 104. Once water has exited tank 102 and tank 102 is empty, ball lifter 810 lifts internal ball 800, and brings external ball 802 up with it. External ball 802 is lifted firmly against rubber anchors 812 such that valve 106 and floor cavity 104 are closed.

Valve 106 is opened and closed through the use of controller 117 connected to ball lifter 810. Controller 117 receives manual inputs from an operator with instructions on when to open and close valve 106 to allow water into and out of tank 102. Controller 117 may also be programmed according to tidal schedules such that manual input is not necessary. Additionally, controller 117 may be connected to sensors 119 to indicate information such that tank height and water capacity of tank such that sensors 119 and controller 117 work together to determine when operational steps described in FIGS. 9 and 10 occur. For example, sensors 119 may include conventional height sensors such as lasers which determine when a tank 102 reaches near peak height or low height of a tide. Electric float level transmitters or floating ball sensors in tank 102 may determine the capacity of water within tank 102 and when tank 102 is empty or full. Valve 106 is illustrated as having external balls 802 and internal balls 800 as blockers for floor cavity 104, but valve 106 could have at least one of the external and internal ball or another type of blocker to close floor cavity 104.

Figure 9:
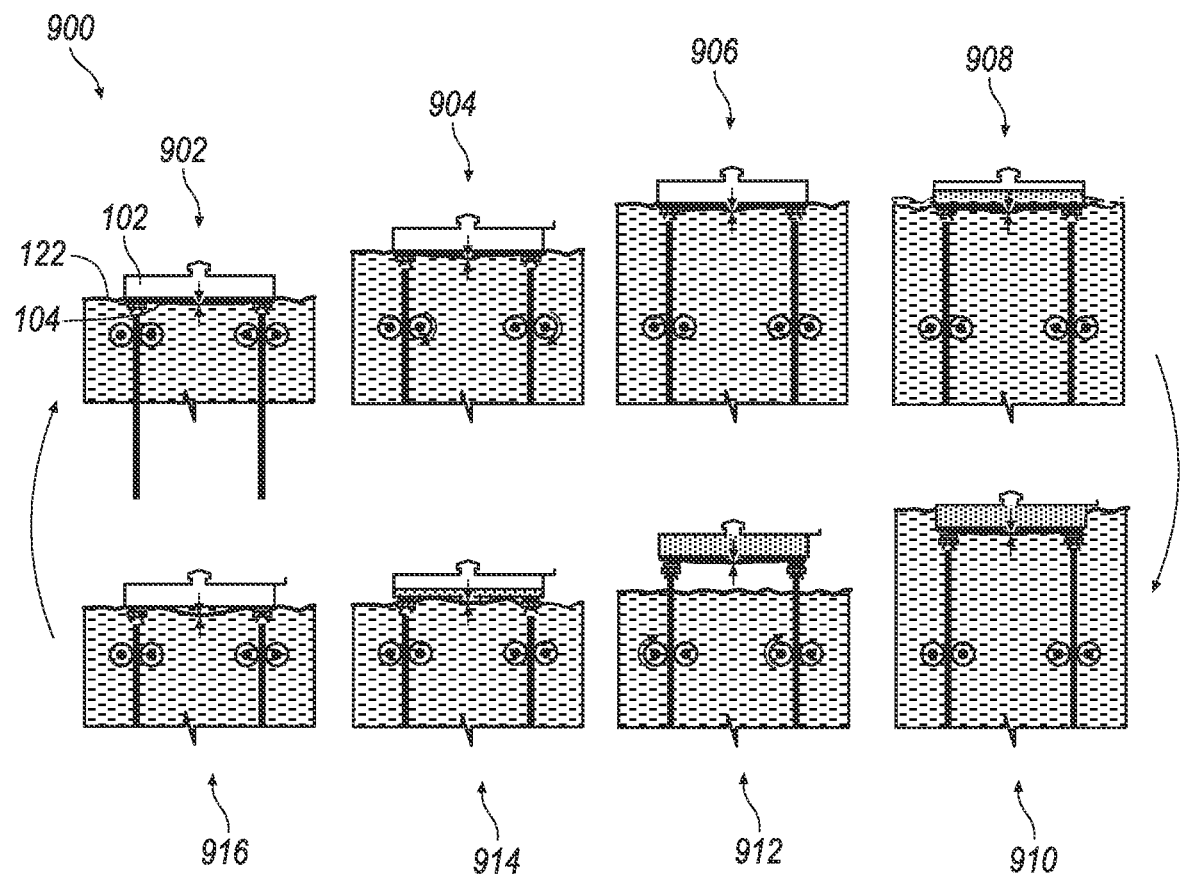
FIG. 9 is a flowchart generally illustrating the operational steps of a hybrid power generation system used in connection with rising and lowering tides.

FIG. 9 is a graph of the operational steps 900, showing operation following the steps 902 through 916 in numerically increasing order, and corresponds to the chart illustrated in FIG. 10 which identifies occurrences at each of steps 902 through 916. At 902, tank 102 is at low tide. Tank 102 floats at the surface level of the water, and lock 506 is floating due to hinge 122 being below water lever. Thus, lock 506 is in an unlocked position and tank 102 is able to pivot with waves as a result of ball joint 504 being able to move in gap 514. External light ball 802 (not shown) is pressed against rubber anchors 812 in valve 106, closing floor cavity 104 such that water is not entering tank 102.

At 904, tide begins to rise, causing tank 102 to move upward with water level. Tank 102 moves upward with the increasing tide, causing vertical gears 110 to rise and power is generated via upward movement transferred from vertical gears 110 to circular gears 112 from circular gears 112 to shafts 118, from shafts 118 to a receiving shaft 220 (also illustrated in FIG. 1), and from receiving shaft 220 to dynamo 116. Lock 506 remains unlocked as hinge 122 remains under water and lock 506 is floating in a raised position. Floor cavity 104 remains closed such that tank 102 remains empty.

At 906, tide approaches high tide. Lock 506 remains unlocked to move with waves, and floor cavity 104 remains closed.

At 908, the tide and tank 102 have reached near peak height and at this stage tank 102 is filling as high tide is reached. Hinge 122 remains under water such that lock 506 is in an upward positioned due to buoyancy of lock 506. Unlocked position of lock 506 allows tank 102 to continue to pivot with waves while at surface level of water and while filling. Valve 106 begins to open such that external ball 802 moves downward to an intermediate position where neither external ball 802 nor internal ball 800 block valve 106. Water is able to enter floor cavity 104 and fill tank 102.

At 910, tide begins to recede. Floor cavity 104 closes, such that internal ball 800 rests firmly against rubber anchors 812, blocking valve 106 and containing water within tank 102.

At 912, the tide has receded below level of tank 102 but tank 102 is suspended from dropping via vertical gear lock 130. Controller 117 thereby defers electrical power generation until the tide has dropped below the bottom or tank 102. Vertical motion of tank 102 may be via a physical stop, such as with vertical gear lock 130. Controller 117 then can selectively operate vertical gear lock 130 to release, giving an opportunity for tank 102, when full, to drop gravitationally and generate power based on parameters that will maximize power production in dynamo 116.

In this operation, hinge 122 is above water level such that lock 506 has moved in a downward position due to gravity. Lock 506 is now positioned against lock stopper 512 such that lock 506 prohibits movement of upper portion 510 on ball joint 504 and tank 102 remains in a horizontal position. Locked position of hinge 122 prohibits tank 102 from pivoting and provides stability to tank 102 as it descends. Floor cavity 104 and valve 106 remain closed due to the position of internal ball 800 against valve 106.

Thus, at 912, tank 102 begins to move downward due to the weight of the water in tank 102. Vertical gears 110 are configured to not hold tank 102 at high point without assistance from buoyancy of tank 102. Therefore, vertical gears 110 begin to move downward from the weight of water, and tank 102 moves downward. The downward movement of vertical gears 110 produces power, as downward movement from vertical gears 110 is transferred to circular gears 114, as rotational movement from circular gears 114 is transferred to shafts 120, as rotational movement from shafts 120 is transferred to receiving shaft 220, and as rotational movement from receiving shaft 220 is inputted to dynamo 116.

At 914, tank 102 catches up with tide and reaches the tides lowest point. Hinges 122 are now under water, allowing lock 506 to float to a raised position due to its buoyancy. In upward position, lock 506 is in an unlocked position such that tank 102 may pivot on ball joint 504 and again sways with wave motion. Just prior to reaching lowest tide and before hitting water level, valve 106 opens to empty water from within tank 102 through floor cavity 104. Internal ball 800 raises to an intermediate position where neither internal ball 800 nor external ball 802 are blocking valve 106 such that water can exit through floor cavity 104. Valve 106 releases water prior to reaching water level such that water may exit tank 102 without water re-entering tank 102. Once empty, valve 106 closes with external ball 802 raising to a position adjacent to and pressed up against rubber anchors 812 to block floor cavity 104.

At 916, tank 102 is empty, lock 506 is in an unlocked position, and tank 102 is floating at water surface level, at which point the cycle begins anew.

The hybrid power generation system may utilize at least three sustainable sources of energy, namely the utilization of rising tides energy, the utilization of receding tides energy, and the utilization of wave energy. The disclosed system illustrates power generation with tidal changes, however smaller increments of power generation may occur with the rise and fall of tank 102 due to ongoing waves. As tank 102 moves upward and downward in small increments with waves, additionally power generation may occur as a tide is rising or falling simultaneously. Additionally, platform 100 can serve as a source of solar energy via solar panels 400 placed on the top surface of tanks 102. Tank 102 may additionally generate power from horizontal movement of tank 102 due to sliding motion from tracks 500, 502. The hybrid system may produce innovative, sustainable, clean, cheap, and environmentally friendly energy at a large scale from the movement of tides. It is known that seawater constitutes about 70% of the Earth's surface, providing a vast resource compared to land-based energy sources.

According to one aspect, a system for generating tidal power comprising a tank supported by at least one vertical gear, such that the tank travels in an upward direction and a downward direction with the at least one vertical gear, the tank travel based on a vertical motion of a tide. At least one circular gear is coupled to the at least one vertical gear, such that the at least one circular gear rotates when the at least one vertical gear moves in the upward direction and the downward direction. A shaft is connected to the at least one circular gear, such that the shaft rotates when the at least one circular gear rotates. A dynamo is attached to the shaft, such that the rotation of the shaft is transmitted to the dynamo for power generation.

According to another aspect, a method of generating tidal power comprising moving a tank in an upward direction and a downward direction, the tank configured to be supported by at least one vertical gear and the at least one vertical gear configured to travel with the tank, the tank travel based on a vertical motion of a tide, rotating at least one circular gear, the at least one circular gear configured such that the at least one circular gear rotates when the at least one vertical gear rises in the upward direction, spinning at least one shaft, the at least one shaft connected to the at least one circular gear such that the at least one shaft spins when the at least one circular gear rotates, and transferring rotation of the at least one shaft to a dynamo, the dynamo configured to generate power from rotational movement of the at least one shaft.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of a hybrid power generation system in the sea, it should be appreciated that the present techniques are not limited to such limited contexts. The provision of examples and explanations in such a context is to facilitate explanation by providing instances of implementations and applications. The disclosed approaches may also be utilized in other contexts or configurations.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A hybrid system for generating power from tidal energy, comprising:
   at least one vertical gear;
   a tank supported by the at least one vertical gear such that the tank travels in an upward direction and in a downward direction with the at least one vertical gear, the tank travel based on a vertical motion of a tide of a tidal water that lifts and lowers the tank;
   at least one circular gear coupled to the at least one vertical gear such that the at least one circular gear rotates when the at least one vertical gear moves in the upward direction and when the at least one vertical gear moves in the downward direction;
   a shaft connected to the at least one circular gear such that the shaft rotates when the at least one circular gear rotates;
   a dynamo attached to the shaft such that the rotation of the shaft is transmitted to the dynamo for power generation; and
   a hinge coupled to the tank and to the at least one vertical gear, the hinge adjustable to (i) a locked position in which the hinge prevents pivoting motion of the tank and (ii) an unlocked position in which the hinge permits pivoting motion of the tank.

2. The system of claim 1, further comprising:
   a floor cavity in a bottom of the tank;
   wherein the floor cavity is configured to open and allow water to fill or empty from the tank; and
   the floor cavity is configured to close and retain water in the tank.

3. The system of claim 1, further comprising:
   a first set of parallel sliding tracks positioned on top of and perpendicular to a second set of parallel sliding tracks;
   the first parallel sliding tracks configured to permit the motion of the tank in a first horizontal direction;
   the second set of parallel sliding tracks configured to permit the motion of the tank in a second horizontal direction.

4. The system of claim 1, wherein:
   the hinge includes a ball joint and a lock;
   the lock is not positively engaged and permits the tank to pivot about the ball joint when the hinge is in the unlocked position; and
   the lock is positively engaged and prohibits the tank from pivoting about the ball joint when the hinge is in all the locked position.

5. The system of claim 4, wherein:
   the hinge further includes an upper hinge portion and a lower hinge portion;
   when the hinge is in the unlocked position, the lock is not positively engaged with at least one of the upper hinge portion and the lower hinge portion such that the tank is pivotable about the ball joint; and
   when the hinge is in the locked position, the lock is positively engaged with the upper hinge portion and the lower hinge portion simultaneously and prevents the tank from pivoting about the ball joint.

6. The system of claim 5, wherein:
   a gap is defined by and between the upper hinge portion and the lower hinge portion;
   the lock includes a buoyant material such that the lock floats on the tidal water;
   when a level of the tidal water is above the lower hinge portion, the lock is raised in line with the upper hinge portion via the tidal water such that the lock does not extend across the gap and positively engage the lower hinge portion; and
   when the level of the tidal water is below the gap, the lock is dropped in line with the lower hinge portion via the tidal water such that the lock extends across the gap and positively engages the upper hinge portion and the lower hinge portion simultaneously.

7. The system of claim 6, wherein:
   the tank includes a floor cavity through which water is flowable, the floor cavity (i) closable to prevent the tidal water from entering the tank or to retain a portion of the tidal water and (ii) openable to allow the tidal water to enter the tank or to empty the retained tidal water from the tank;
   in a first portion of operation, the level of the tidal water is above the lower hinge portion and the tide is rising, the hinge is in the unlocked position, the floor cavity is closed, and the tank and the at least one vertical gear area rising with the tide relative to the at least one circular gear;

in a second portion of operation, the level of the tidal water is above the lower hinge portion and the tide is rising, the hinge is in the unlocked position, the floor cavity is open, and the tank and the at least one vertical gear area at a high point relative to the at least one circular gear;

in a third portion of operation, the level of the tidal water is below the gap, the hinge is in the locked position, the floor cavity is closed, and the tank and the at least one vertical gear area descending relative to the at least one circular gear; and in a fourth portion of operation, the level of the tidal water is above the lower hinge portion, the hinge is in the unlocked position, the floor cavity is open, and the tank and the vertical gear area at a low point relative to the at least one circular gear.

8. The system of claim 3, wherein the motion of the tank in the first horizontal direction and the motion of the tank in the second horizontal direction is transmitted for power generation.

9. The system of claim 1, further comprising a solar panel arranged on a top surface of the tank, wherein the solar panel is configured to generate power separately from the dynamo.

10. A method of generating power from tidal energy, comprising:

moving a tank in an upward direction and in a downward direction, the tank coupled to at least one vertical gear, the at least one vertical gear configured to travel with the tank, the tank travel based on a vertical motion of a tide of a tidal water;

selectively permitting pivoting motion of the tank relative to the at least one vertical gear via adjusting a position of a hinge coupled to the tank and to the at least one vertical gear;

rotating at least one circular gear via the at least one vertical gear, the at least one circular gear connected to the at least one vertical gear such that movement of the at least one vertical gear in at least one of the upward direction and the downward direction rotates the at least one circular gear;

spinning at least one shaft via rotating the at least one circular gear, the at least one shaft connected to the at least one circular gear such that rotation of the at least one circular gear spins the at least one shaft; and transferring rotation of the at least one shaft to a dynamo, the dynamo configured to generate power from rotational movement of the at least one shaft;

wherein adjusting the position of the hinge includes:
adjusting the hinge to an unlocked position in which pivoting motion of the tank relative to the at least one vertical gear is permitted; and
adjusting the hinge to a locked position in which pivoting motion of the tank relative to the at least one vertical gear is prevented.

11. The method of claim 10, further comprising operating a floor cavity of the tank based on a vertical position of the tank, wherein operating the floor cavity of the tank based on the vertical position of the tank includes:

opening the floor cavity when the tank reaches a peak height of the tide;

closing the floor cavity once the tank is full of the tidal water;

opening the floor cavity when the tank reaches a low height of the tide; and closing the floor cavity once the tank is empty of the tidal water.

12. The method of claim 10, wherein:
the hinge includes a ball joint, a lock, an upper hinge portion, and a lower hinge portion;
adjusting the hinge to the locked position includes positively engaging the lock with the upper hinge portion and the lower hinge portion simultaneously to prevent the tank from pivoting about the ball joint; and
adjusting the hinge to the unlocked position includes positively engaging the lock with only one of the upper hinge portion and the lower hinge portion to permit the tank to pivot about the ball joint.

13. The method of claim 10, wherein:
the tank is connected to a first set of parallel tracks and to a second set of parallel tracks, the first set of tracks arranged on top of and extending perpendicular to the second set of tracks such that the first set of tracks permit the tank to slide in a first horizontal direction and the second set of tracks permit the tank to slide in a second horizontal direction; and
the method further comprises generating power from the tank sliding in the first horizontal direction and from the tanking sliding in the second horizontal direction.

14. The method of claim 10, further comprising:
raising the tank and lowering the tank with the motion of waves, such that power is generated with vertical movement of the tank from the waves simultaneously with the vertical movement of the tank from the tide.

15. The method of claim 10, further comprising:
raising the tank to a peak height of the tide during a first half of a single operational cycle, the tank configured to rise with the tide; and
descending the tank to a low height of the tide during a second half of a single operational cycle, the tank configured to descend at a rate slower than the tide.

16. The method of claim 15, wherein:
the tank includes a floor cavity through which water is flowable and a valve via which the floor cavity is (i) closable to prevent the tidal water from entering the tank or to retain a portion of the tidal water and (ii) openable to allow the tidal water to enter the tank or to empty the retained tidal water from the tank; and
the method further comprises:
when the tank reaches the peak height of the tide, actuating the valve to open the floor cavity and allowing the tidal water to flow into the tank through the floor cavity and fill the tank; and
when the tank reaches the low height of the tide, actuating the valve to open the floor cavity and emptying the retained tidal water from the tank via the floor cavity.

17. The method of claim 12, wherein:
the lock includes a buoyant material such that the lock floats on the tidal water;
a gap is defined by and between the upper hinge portion and the lower hinge portion;
positively engaging the lock with the upper hinge portion and the lower hinge portion simultaneously includes dropping the lock in line with the lower hinge portion such that the lock extends across the gap and positively engages the lower hinge portion;
dropping the lock in line with the lower hinge portion includes floating the lock on the tidal water as a level of the tidal water falls relative to the hinge such that the tidal water drops the lock into positive engagement with the lower hinge portion; and the lock is positively engaged with the upper hinge portion and the lower hinge portion simultaneously when the level of the tidal water is below the gap.

18. The method of claim 12, wherein:
the lock includes a buoyant material such that the lock floats on the tidal water;
a gap is defined by and between the upper hinge portion and the lower hinge portion;
positively engaging the lock with only one of the upper hinge portion and the lower hinge portion includes raising the lock in line with the upper hinge portion such that the lock does not extend across the gap and positively engage the lower hinge portion;
raising the lock in line with the upper hinge portion includes floating the lock on the tidal water as a level of the tidal water rises relative to the hinge such that the tidal water moves the lock away from the lower hinge portion;
the lock does not positively engage the lower hinge portion when the level of the tidal water is above the lower hinge portion; and
the hinge is in the unlocked position when the tank is floating and rising with the tide.

19. The method of claim 15, further comprising, prior to descending the tank to the low height of the tide, maintaining the tank at the peak height of the tide as the tide recedes.

20. The method of claim 19, wherein maintaining the tank at the peak height of the tide as the tide recedes includes suspending the tank above the tide water as the tide recedes.

\* \* \* \* \*